UNITED STATES PATENT OFFICE.

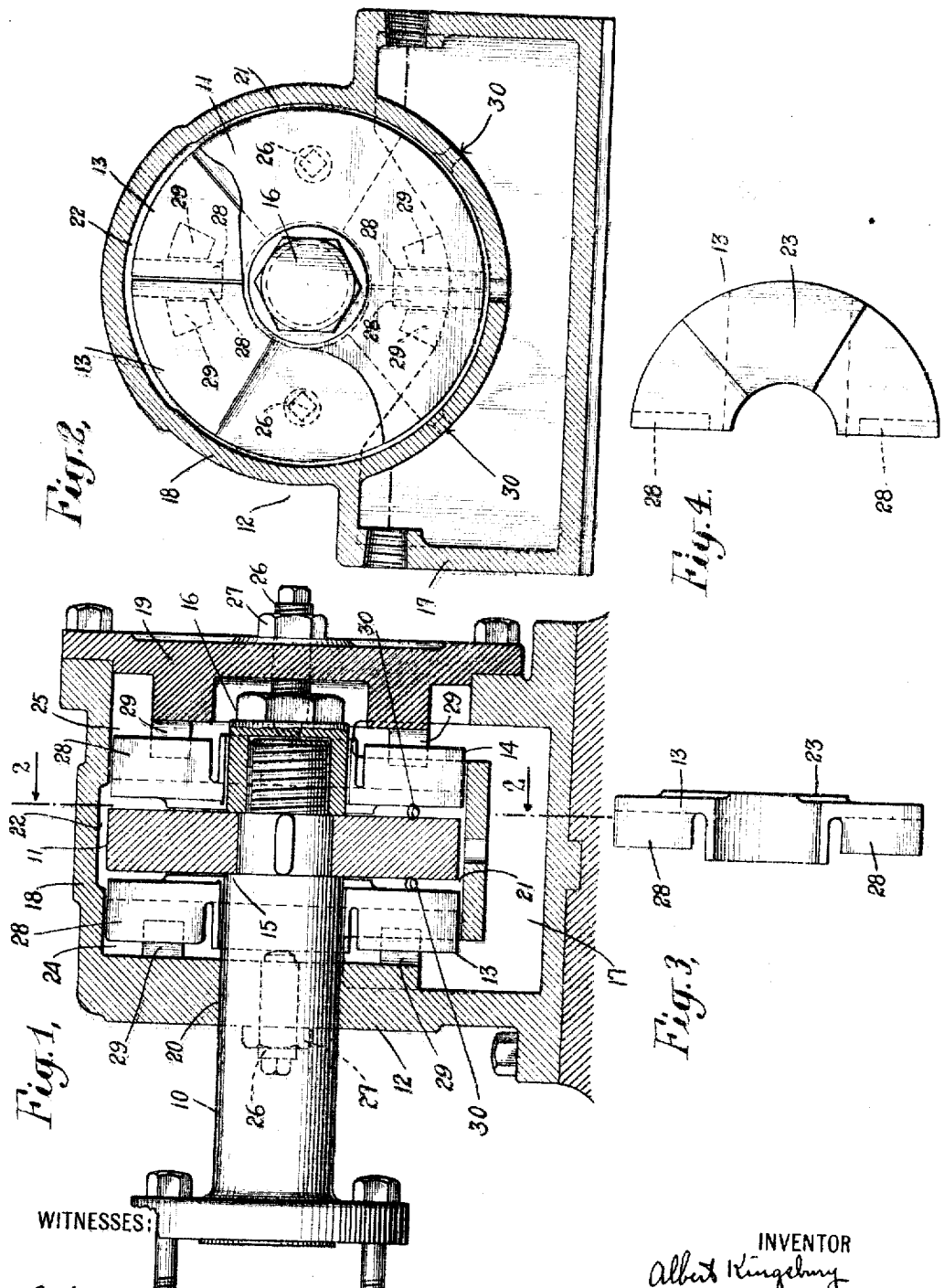
A. KINGSBURY.
HORIZONTAL THRUST BEARING.
APPLICATION FILED JAN. 9, 1915.
1,242,948.
Patented Oct. 16, 1917.

ALBERT KINGSBURY, OF PITTSBURGH, PENNSYLVANIA.

HORIZONTAL-THRUST BEARING.

1,242,948.  Specification of Letters Patent.  Patented Oct. 16, 1917.

Application filed January 9, 1915. Serial No. 1,818.

*To all whom it may concern:*

Be it known that I, ALBERT KINGSBURY, a citizen of the United States of America, and a resident of Pittsburgh, county of Allegheny, and State of Pennsylvania, have invented certain new and useful Improvements in Horizontal-Thrust Bearings, of which the following is a specification, reference being had to the accompanying drawings, forming a part thereof.

My invention relates to bearings and has special reference to such as are adapted to sustain the axial thrust of horizontal shafts.

The housings of thrust bearings of the aforesaid character are in some cases subject to a deflection by reason of the fact that they are secured to a stationary base or support at a material distance below or to one side of the axis of the shaft where the resultant thrust is applied to the housing. If the stationary bearing surfaces which coöperate with the thrust collar of the shaft, are fixed relative to the housing as in ordinary thrust bearings, this deflection results in throwing the bulk of the load against that portion of the bearing surface which is near the base or housing support.

One object of my invention is to provide a simple and durable thrust bearing which shall be particularly adapted for use with horizontal shafts and arranged to avoid the aforesaid objections.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is a longitudinal elevation with the housing shown in section, of a horizontal thrust bearing arranged and constructed in accordance with my invention.

Fig. 2 is a transverse sectional elevation taken on the line 2—2 of Fig. 1.

Detail views of one of the shoes which forms a part of the same bearing are shown in Figs. 3 and 4.

The bearing illustrated comprises in general, a shaft 10, to which is secured a thrust collar 11, a housing 12, and two pairs of bearing shoes 13—13 and 14—14.

The collar is clamped against a shoulder 15 by means of a nut 16, but it may be secured to the shaft in any suitable way.

The housing has a hollow base 17 which is adapted to contain a body of oil or other suitable lubricating fluid, and a hollow cylindrical box 18 in which the bearing shoes are supported. A cover 19 is bolted to the housing at one end, the other end of the cylindrical box 18 being provided with an opening 20 through which the shaft 10 extends. The collar 11 is located within the cylindrical box 18 and is only slightly smaller in diameter than the interior of the box so that a narrow annular passage 21 is provided between the outer cylindrical surface of the collar and the adjacent surface of the box. The box is, however, provided with a recess 22 near the top so that the collar is separated from the wall of the box to a greater extent at this point (see Figs. 1 and 2).

Each of the shoes, as clearly shown in Figs. 3 and 4, is semi-annular in form and has a sector-shaped bearing surface 23 which is raised above the remainder of the shoe and is about centrally located. In other words, the shoes may be described as having a central sector-shaped bearing section and extensions which have depressed or undercut surfaces that lie adjacent to the annular bearing surface with which the bearing shoes, coöperate.

The shoes are fitted loosely into the annular spaces 24 and 25 between the collar and the respective ends of the box. The bearing sectors are disposed on laterally opposite sides of the shaft, the line of division between each pair of shoes being vertical. Each shoe is tiltably mounted on an adjustable pivot 26 which in the structure illustrated, has the form of a bolt with a convex spherically curved end which extends through a tapered hole in the end wall of the box in a direction substantially parallel to the axis of the shaft. The pivot bolt is fixed in any suitable position to which it may be adjusted, by means of a nut 27. All of the four pivot bolts on which the four shoes are tiltingly supported, are in a single horizontal plane which includes the axis of the shaft and they engage the shoes at points on their backs which are nearly opposite the centers of the bearing surfaces.

The shoes are provided near their adjacent ends with projections 28 which extend between pairs of guide projections or lugs 29 which extend axially from the end of the housing and cover.

The arrangement of parts is such that a certain freedom of movement of the shoes is permitted while their rotation about the center of the shaft is prevented and the extent to which they may be tilted is limited.

It will be evident that the shoes are free to tilt on their pivots so as to compensate for deflections of the housing produced by the force of the thrust sustained by the shoes.

The number and mounting of the shoes is arranged to compensate for the deflection of the housing as already pointed out but the form of the shoes which is semi-annular is for the purpose of providing a wall between the shaft and the housing so that the oil will circulate as follows: Oil adhering to the collar 11 is carried around in the annular passage 21 and also fills the recess 22 at the top. Its flow is then divided and some of the oil continues to flow to the periphery of the collar. The remainder overflows on each side and fills the spaces formed between the upper extensions of the shoes and the shaft collar. It is thus evident that by this means the whole surface of the collar is covered with oil, except that which is covered by the bearing surfaces of the shoes, and oil is carried under the bearing surfaces since it adheres to the faces of the collar.

The operation and mounting of the tiltingly supported shoes corresponds to the structures set forth in my Patents 917,242, granted January 25, 1910, and 1,117,501, granted November 17, 1914, and the system of automatic lubrication apart from the bearing structure, is set forth in my copending application Serial No. 1518, filed of even date herewith.

What I claim is:

1. A thrust bearing comprising a horizontal shaft having a thrust collar with annular thrust bearing surfaces, a stationary housing, a pair of axially adjustable pivots mounted in the housing in the horizontal plane of the axis of the shaft, and a pair of bearing shoes tiltingly mounted on said pivots and having bearing surfaces cooperating with the annular surface of the thrust collar on opposite sides of the shaft.

2. A thrust bearing comprising a horizontal shaft having a thrust collar with annular thrust bearing surfaces, a stationary housing, a pair of axially adjustable pivots mounted in the housing in the horizontal plane of the axis of the shaft, a pair of semi-annular bearing shoes having sector-shaped bearing surfaces raised above the body of the shoe and cooperating with the annular bearing surface of the thrust collar on opposite sides of the shaft.

3. A thrust bearing comprising a rotatable member having a horizontal axis and an annular thrust bearing surface, a pair of pivots located on diametrically opposite sides of the axis of the rotatable member and in the same horizontal plane therewith, and two bearing shoes tiltingly mounted on the respective pivots and cooperating with two opposite portions of the annular thrust bearing surfaces.

4. A thrust bearing comprising a rotatable member having a horizontal axis and an annular thrust bearing surface, a pair of pivots located on diametrically opposite sides of the axis of the rotatable member and in the same horizontal plane therewith, two bearing shoes tiltingly mounted on the respective pivots and cooperating with two opposite portions of the annular thrust bearing surfaces and means for preventing a rotative movement of the shoes about the shaft.

5. A thrust bearing comprising a rotatable shaft, a thrust collar thereon having an annular bearing surface, a relatively stationary housing, a pair of supports adjustably mounted in the housing at diametrically opposite points relative to the shaft and extending in an axial direction, a bearing shoe tiltingly mounted on each support and comprising a semi-annular member having a bearing sector cooperating with the annular bearing surface of the thrust collar, and means for preventing rotation of the shoe about the shaft.

6. A thrust bearing comprising a horizontal shaft having a thrust collar with a pair of annular thrust bearing surfaces, a stationary housing, two pairs of axially adjustable pivots mounted in the housing in the horizontal plane of the axis of the shaft, a pair of semi-annular bearing shoes tiltingly mounted on each pair of pivots, each pair of shoes having segmental annular bearing surfaces adapted to engage the annular surfaces of the thrust collar on opposite sides of the shaft, and means for preventing rotation thereof about the shaft.

7. A thrust bearing for horizontal shafts having an annular thrust surface comprising a stationary housing affixed to a support at a material distance from the center of the shaft and thrust bearing members mounted in the housing, uniformly spaced about the axis of the shaft and adapted to tilt about a centrally transverse axis to compensate for the deflection of the housing.

8. A thrust bearing for shafts having an annular thrust surface comprising tiltingly supported shoes provided with contact surfaces adapted to engage the annular thrust surface and projections having undercut surfaces extending close to the annular thrust surface between the contact surfaces of the shoes.

9. A thrust bearing for horizontal shafts having an annular thrust surface, comprising a stationary housing, a plurality of thrust bearing shoes tiltingly supported by said housing and engaging portions of the thrust surface, said shoes having circularly curved projections and undercut surfaces extending close to the annular thrust surface and forming a wall adjacent to said surface between the bearing surfaces of the shoes.

10. A thrust bearing comprising a rotatable member having an annular thrust surface, a pair of axially adjustable, relatively stationary pivots on opposite sides of the axis of the rotatable member, and a pair of bearing shoes tiltingly mounted on said pivots and having bearing surfaces coöperating with the annular thrust surface on opposite sides of the axis.

11. A thrust bearing comprising a rotatable and a stationary bearing member, one of said members having a plane thrust surface and the other of said members having a pair of pivots on opposite sides of the axis of the rotatable member, and bearing shoes tiltingly mounted on said pivots and having bearing surfaces coöperating with the plane thrust surface of the one.

In testimony whereof I have hereunto set my hand this 4th day of January, 1915, in the presence of two subscribing witnesses.

ALBERT KINGSBURY.

Witnesses:
C. W. McGhee,
M. R. MacMillan.